US010227784B2

(12) United States Patent
Stuart et al.

(10) Patent No.: US 10,227,784 B2
(45) Date of Patent: Mar. 12, 2019

(54) MODULAR DECK LIGHT

(71) Applicant: Lacks Home Products, Kentwood, MI (US)

(72) Inventors: Scott Stuart, Grand Rapids, MI (US); Michael Modrusic, Novi, MI (US)

(73) Assignee: Lacks Home Products, Kentwood, MI (US)

(*) Notice: Subject to any disclaimer, the term of this patent is extended or adjusted under 35 U.S.C. 154(b) by 338 days.

(21) Appl. No.: 15/049,793

(22) Filed: Feb. 22, 2016

(65) Prior Publication Data

US 2017/0241627 A1 Aug. 24, 2017

(51) Int. Cl.
| *E04F 19/02* | (2006.01) |
| *F21V 21/088* | (2006.01) |
| *F21S 9/03* | (2006.01) |
| *F21V 19/00* | (2006.01) |
| *F21V 23/00* | (2015.01) |
| *F21Y 115/10* | (2016.01) |
| *F21V 21/34* | (2006.01) |
| *F21W 131/10* | (2006.01) |
| *E04F 11/18* | (2006.01) |

(52) U.S. Cl.
CPC ............. *E04F 19/02* (2013.01); *F21S 9/037* (2013.01); *F21V 19/0045* (2013.01); *F21V 21/088* (2013.01); *F21V 23/002* (2013.01); *E04F 2011/1872* (2013.01); *F21V 21/34* (2013.01); *F21W 2131/10* (2013.01); *F21Y 2115/10* (2016.08); *Y02B 20/72* (2013.01)

(58) Field of Classification Search
CPC . E04F 19/02; E04F 2011/1872; F21V 23/002; F21V 21/088; F21V 19/0045; F21V 21/34; F21S 9/037; Y02B 20/72; F21W 2131/10; F21Y 2115/10

See application file for complete search history.

(56) References Cited

U.S. PATENT DOCUMENTS

| 4,825,590 | A | 5/1989 | Cullinane |
| 5,118,059 | A | 6/1992 | Mainer |
| 6,526,905 | B2 | 3/2003 | Hawk |
| 7,931,385 | B1 * | 4/2011 | Smith ...................... F21S 9/03 362/145 |

(Continued)

FOREIGN PATENT DOCUMENTS

KR 101498268 B1 3/2015

*Primary Examiner* — Anh T Mai
*Assistant Examiner* — Glenn Zimmerman
(74) *Attorney, Agent, or Firm* — John S. Artz; Dickinson Wright PLLC

(57) ABSTRACT

A deck light assembly for attachment to a deck railing includes a C-shaped body with a core nesting within a cover and a top plate extending between two legs. A foot extends inwardly from each of the legs to engage the bottom of the deck railing and secure the deck light assembly thereon. A solar panel on the top plate charges a battery and causes an LED light to illuminate in the absence of ambient light. A shade on the outer surface of one of the legs directs light downwardly. One leg includes a catch with a planar portion biased inwardly to engage the deck railing and configured to flex outwardly to disengage from the deck railing. A nub extends from the catch for application of an outward force to flex the planar portion for attaching or removing the deck light assembly from the deck railing.

20 Claims, 5 Drawing Sheets

(56) References Cited

U.S. PATENT DOCUMENTS

| | | | | |
|---|---|---|---|---|
| 7,937,385 B2 * | 5/2011 | Bestgen | ............... | G06F 17/3048 |
| | | | | 707/713 |
| 8,801,214 B2 | 8/2014 | Chrysanthous | | |
| 8,806,736 B1 * | 8/2014 | Novak | ................ | E04F 11/1861 |
| | | | | 256/23 |
| 9,206,951 B2 | 12/2015 | McLennan et al. | | |
| 2003/0178933 A1 * | 9/2003 | Yan | ....................... | H01J 61/322 |
| | | | | 313/493 |
| 2006/0277823 A1 * | 12/2006 | Barnett | ............... | F21V 21/0824 |
| | | | | 47/33 |
| 2013/0076269 A1 | 3/2013 | Shilton | | |
| 2015/0251735 A1 | 9/2015 | O'Maley, Jr. | | |
| 2016/0327233 A1 * | 11/2016 | Wei | ......................... | F21S 9/037 |
| 2017/0241626 A1 * | 8/2017 | Stuart | ................... | F21V 21/088 |

* cited by examiner

MODULAR DECK LIGHT

TECHNICAL FIELD

The present disclosure relates generally to light assemblies for attachment to the railing of a deck, such as those found on residential and commercial patios. More specifically, the present disclosure relates to a deck light having a C-shaped body with a catch for releasably securing the deck light assembly to the deck railing.

BACKGROUND OF THE DISCLOSURE

Light assemblies have long been available for attachment or use with decks, such as those installed on household or commercial patios. Many of such light assemblies include LED lights with batteries and solar cells to charge the batteries during daylight hours. Stalk-type lights are the most common of such light assemblies and typically include a round lens on top of a post or pole, with a pointed stake at the bottom for holding the light upright in the ground. The round lenses on such stalk-type lights allow them to provide illumination in all directions. Variations on the stalk-type light are known for use with decks, such as those with a clip or clamp in place of or in addition to the pointed stake. Another known type of light assembly for use with decks is an L-Shaped light, which is typically screwed in place on a vertical edge such as a stair tread or railing side. These L-shaped lights typically include lenses with a horizontal profile and a semicircular cross-section to provide downward and outward illumination.

In view of the above, there remains a need for an improved deck light assembly that provides for a compact profile, and which can be easily installed and removed from a deck railing. Such a compact profile is both aesthetically appealing and functionally advantageous in that a compact deck light is less likely to be bumped or blown out of place. There also remains a need for a deck light that provides tasteful and useful directed lighting and which remains in place until a person choses to relocate it, and which requires minimal effort to disengage from the deck railing.

SUMMARY OF THE DISCLOSURE

It is therefore an aspect of the present disclosure to provide a compact light assembly for attachment to a deck railing.

It is another aspect of the present disclosure to provide a light assembly for attachment to a deck railing that can be readily attached and detached.

In accordance with the above and other aspects, a deck light assembly for attachment to a deck railing is provided. The deck light assembly includes a C-shaped body including a top plate that extends between a first leg and an opposing second leg. The top plate defines an upper surface facing generally upward and a lower surface between the legs for engaging a top surface of the deck railing. A battery and an LED light may be disposed within the body of the deck light assembly. The deck light assembly may include a catch as a portion of the first leg with a planar portion extending away from the top plate and biased inwardly to engage the deck railing and configured to flex outwardly for disengaging the deck light assembly from the deck railing. The deck light assembly may also include a first foot extending inwardly from the planar portion of the catch for engaging the bottom surface of the deck railing to secure the deck light assembly in place on the deck railing.

BRIEF DESCRIPTION OF THE DRAWINGS

Other aspects of the present disclosure will be readily appreciated, as the same becomes better understood by reference to the following detailed description when considered in connection with the accompanying drawings wherein.

DESCRIPTION OF THE PREFERRED EMBODIMENTS

Figure 1:
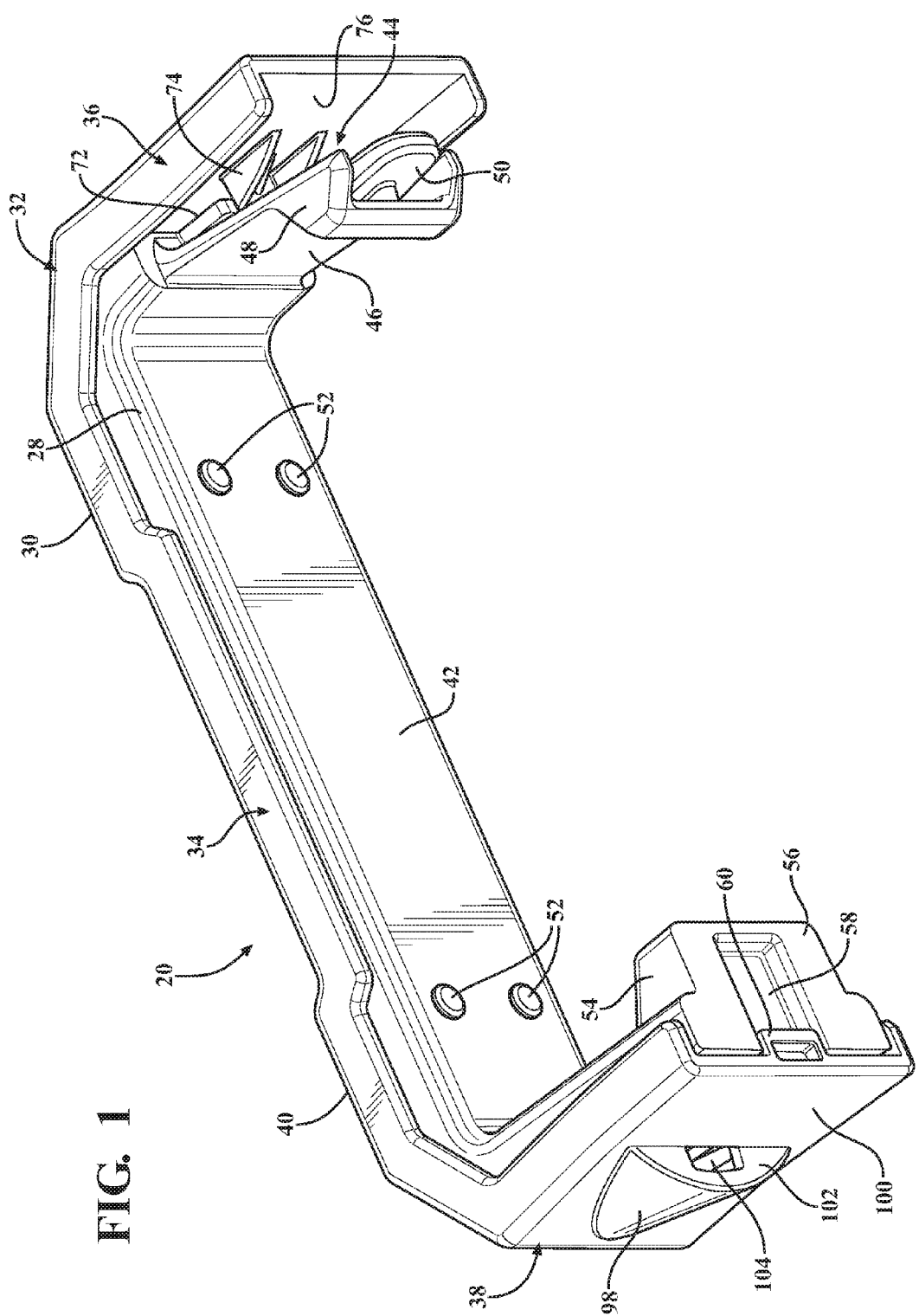
FIG. 1 is a perspective view of a deck light assembly in accordance with an aspect of the disclosure.

Referring to the Figures, wherein like numerals indicate corresponding parts throughout the several views, a deck light assembly 20 is generally shown for attachment to a deck railing 22 having a top surface 24 and a bottom surface 26. According to an aspect, the disclosed deck light assembly 20 can be easily attached and retained on a deck rail without the need to use wood screws or other permanent security mechanism. According to an aspect, the disclosed deck light assembly 20 can be located for direct lighting placement to allow increased visibility at night, such as for illuminating a plant, a drink cooler, a water feature, etc. This can be accomplished by a simple push and release mechanism, such as disclosed herein.

According to an aspect, as exemplarily shown in FIGS. 1-5, the deck light assembly 20 includes a C-shaped core 28 nested within a C-shaped cover 30 together comprising a C-shaped body 32. The cover 30 and the body 32 may be fixedly secured to one another but may also be detachable. The C-shaped body 32 includes a top plate 34 extending between a first leg 36 and a second leg 38. The top plate 34 defines an upper surface 40 facing generally upward and a lower surface 42 between the legs 36, 38 for engaging the top surface 24 of the deck railing 22. It will be appreciated that the assembly 20 could be utilized in connection with a variety of other suitable applications. According to an aspect, the assembly 20 may be constructed of a durable and weatherable material, such as a plastic material.

Figure 5:
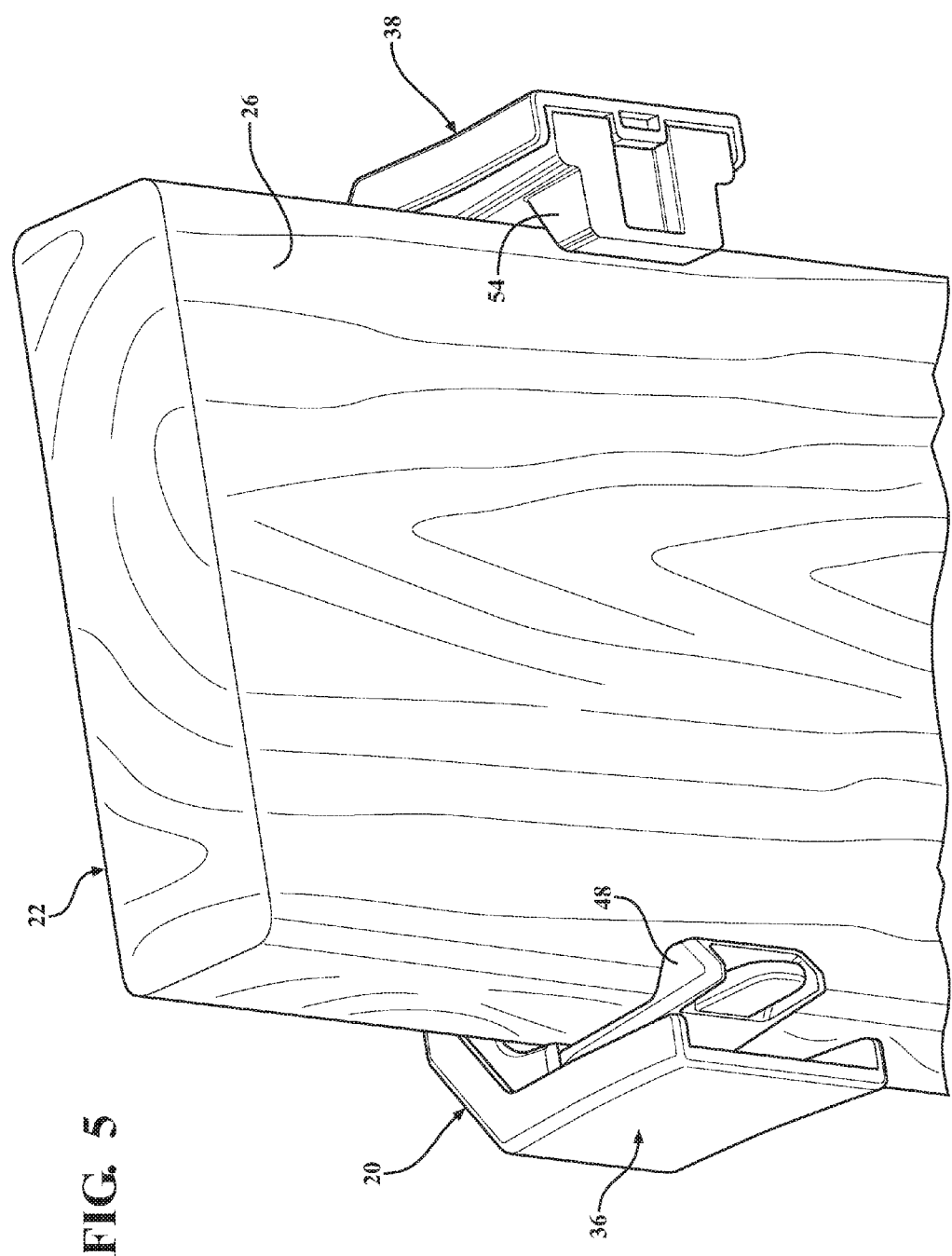
FIG. 5 is a perspective view of a deck light assembly engaging a deck railing in accordance with an aspect of the disclosure.

According to an aspect and as exemplarily shown in FIG. 1, a catch 44 is integrally formed with the core 28 and disposed on the first leg 36. The catch 44 can include a planar portion 46 extending away from the top plate 34 to a first foot 48. The catch 44 may be biased inwardly to engage the planar portion 46 and the first foot 48 with the deck railing 22, as shown in FIG. 5. The catch 44 may also be configured to flex outwardly for disengaging the deck light assembly 20 from the deck railing 22. With the catch 44 in its outward or disengaged position, the deck light assembly 20 may be slid along the deck railing 22 to another location or may be lifted and removed entirely. A nub 50 may extend generally downward from the catch 44 beyond the first foot 48 for application of an outward force to cause the planar portion 46 to flex outwardly and allow the deck light assembly 20 to be attached or removed from the deck railing 22. The nub 50 may have an arc-shape configured to be pushed or pulled with a thumb or finger. However, it may have a variety of other suitable configurations.

According to an aspect shown in FIG. 1, a plurality of standoffs 52 may be disposed on the lower surface 42 of the top plate 34 for spacing the deck light assembly 20 from the top surface 24 of the deck railing 22 and allowing airflow therebetween. This spacing may provide for cooling of the deck light assembly 20 and also prevent moisture from collecting therebetween.

According to an aspect, and as exemplarily shown in FIG. 5, the first foot 48 can extend inwardly from the first leg 36 of the core 28 opposite the top plate 34 for engaging the bottom surface 26 of the deck railing 22 to secure the deck light assembly 20 in place on the deck railing 22. The first foot 48 may have a generally triangular cross-section. A second foot 54 may extend inwardly from the second leg 38 of the core 28 opposite the top plate 34 for engaging the bottom surface 26 of the deck railing 22 to further secure the deck light assembly 20 in place on the deck railing 22. The second foot 54 may have a generally trapezoidal cross-section with a floor 56 that extends parallel to and spaced from the top plate 34. According to one aspect, the floor 56 can define an indentation 58 configured to receive a first tab 60 that extends inwardly from the second leg 38 of the cover 30 to secure the core 28 with the cover 30. The indentation 58 in the floor 56 of the second foot 54 and the first tab 60 may each, for example, have corresponding rectangular shapes. It should be appreciated that the feet 48, 54 may have other cross-sections including, as examples, L-shaped, triangle, trapezoid, semicircular, and combinations thereof.

Figure 2:
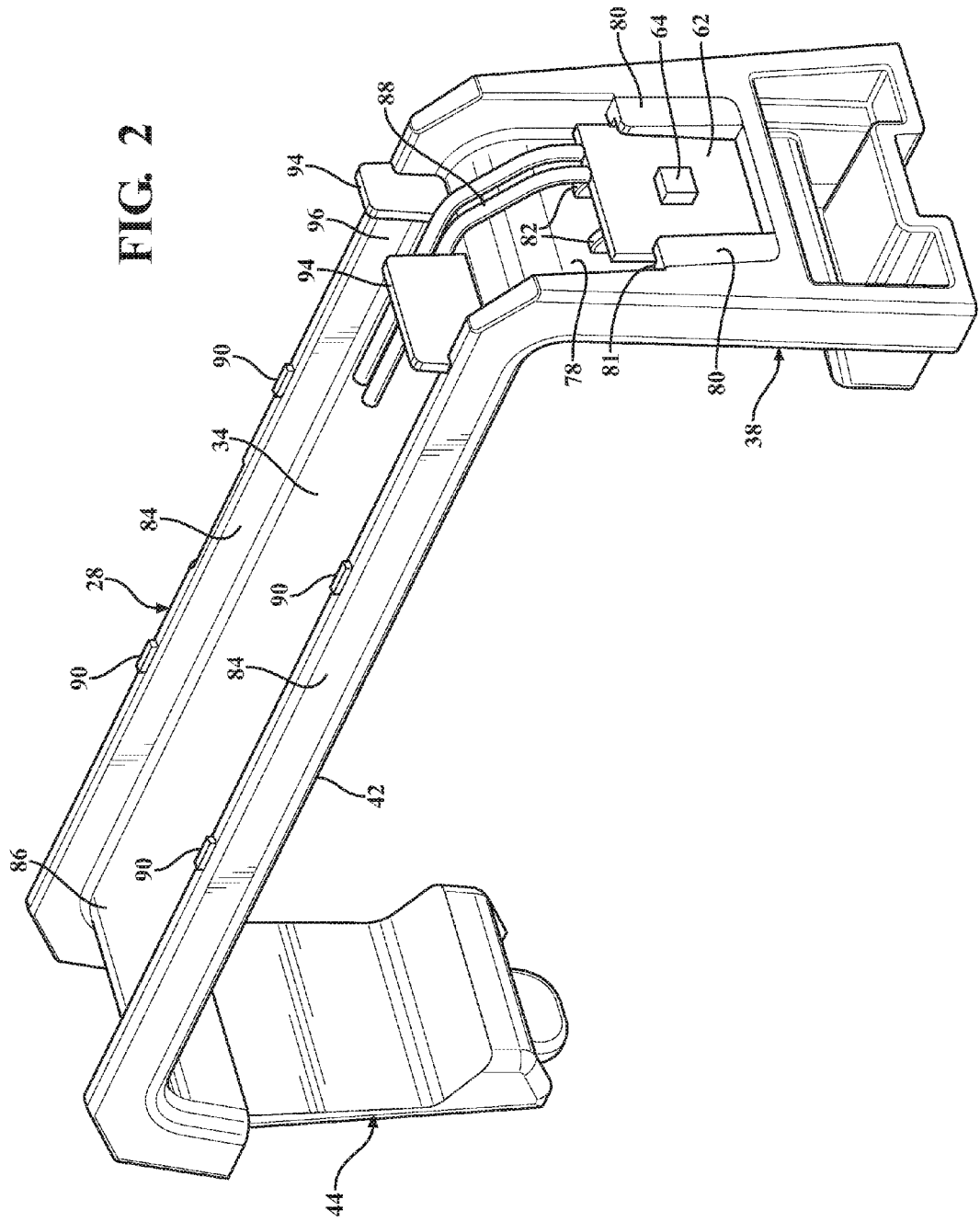
FIG. 2 is a perspective view of a core for a deck light assembly in accordance with an aspect of the disclosure.
Figure 3:
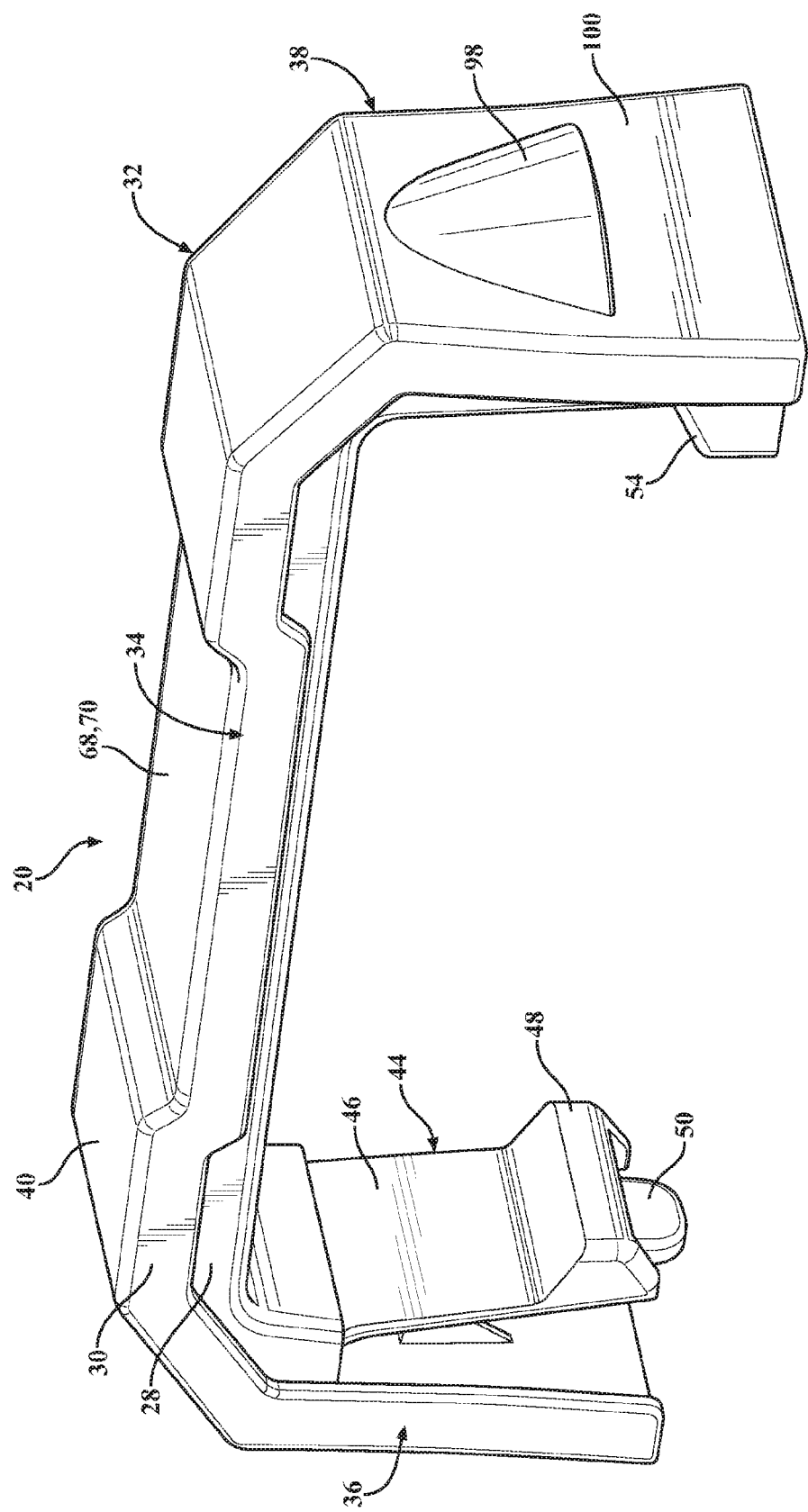
FIG. 3 is a perspective view of a deck light assembly in accordance with an aspect of the disclosure.
Figure 4:
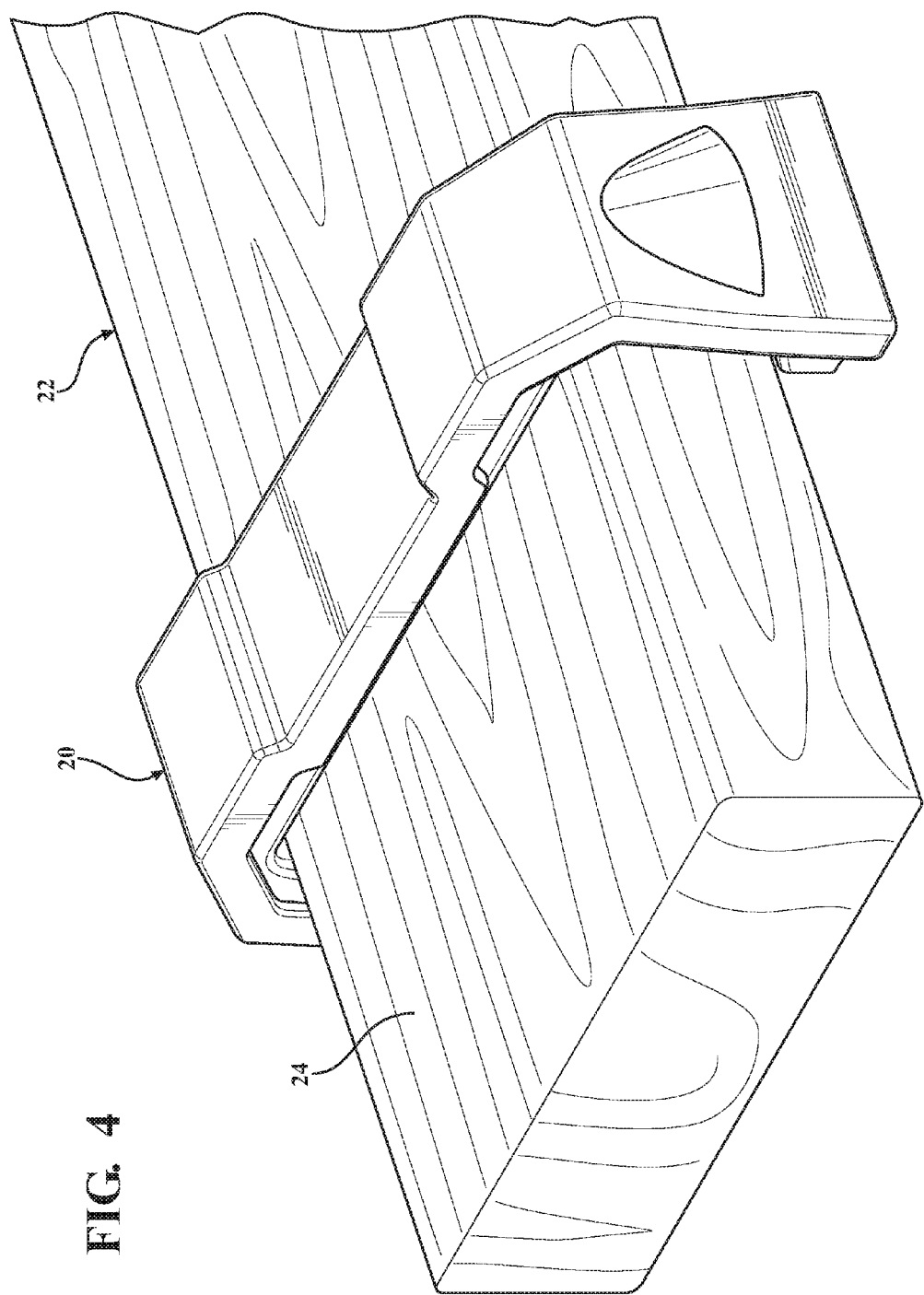
FIG. 4 is a perspective view of a deck light assembly engaging a deck railing in accordance with an aspect of the disclosure.

According to an aspect and as exemplarily shown in FIG. 2, a circuit board 62 with an LED light 64 may be disposed between the core 28 and the cover 30. A battery 66 (not shown in the Figures) may also be disposed between the core 28 and the cover 30 within the deck light assembly 20. Those skilled in the art would appreciate that other energy storage devices, such as capacitors, could be used in place of a battery 66.

According to an aspect, the upper surface 40 of the top plate 34 can define an inset panel 68 located centrally between the legs 36, 38 which can hold a solar panel 70 for charging the battery 66 when exposed to light and causing the circuit board 62 to illuminate the LED light 64 in response to an absence of ambient light. It should be appreciated that the solar panel 70 may also be mounted flush with or protruding above the upper surface 40 of the top plate 34.

According to an aspect and as exemplarily shown in FIG. 1, a second tab 72 may be integrally formed with the core 28 as a portion of the first leg 36 and can extend perpendicular to the top plate 34 adjacent the cover 30. A ledge 74 may be integrally formed with the cover 30 extending inwardly from an inner surface 76 of the first leg 36 for engaging the second tab 72 to secure the core 28 with the cover 30 at the first leg 36.

According to an aspect and as exemplarily shown in FIG. 2, the core 28 can define an interior surface 78 on the second leg 38 with a set of third tabs 80 defining a pocket 81 on the interior surface 78 for holding the circuit board 62 with the LED light 64 attached. A set of rails 82 may protrude from the interior surface 78 within the pocket for securing the circuit board 62 in wedging engagement with the third tabs 80.

According to an aspect and as exemplarily shown in FIG. 2, the core 28 may define a pair of walls 84 extending upwardly from the lower surface 42 parallel to one another along the sides of the top plate 34. A cavity 86 can extend between the walls 84 of the core 28 and below the cover 30 and may contain any combination of wires 88 and the solar panel 70 and the battery 66 and the circuit board 62. A plurality of fourth tabs 90 may extend further upward from the walls 84 for engaging corresponding depressions 92 (not shown) in the cover 30 to prevent relative motion between the core 28 and the cover 30. A partition 94 may extend between the walls 84 adjacent the second leg 38 and may define a notch 96 for accepting wires 88 between any of the solar panel 70 and the circuit board 62 and the battery 66 and the LED light 64.

The deck light assembly 20 may include a shade 98 with the LED light 64 contained therein for directing the output of the LED light 64 in a predetermined pattern. According to an aspect and as exemplarily shown in FIG. 1, the shade 98 can be parabolic parabolic shape protruding from an outer surface 100 of the second leg 38 and can extend to a flat bottom 102 defining a hole 104 of generally rectangular shape for allowing light to shine downwardly from the deck railing 22.

According to another aspect, the deck light assembly 20 may be configured for attachment to a deck railing having one or more surfaces. The deck light assembly 20 may include a body 32 having an interior surface configured to mimic at least a portion of the deck railing 22. A portion of the body 32 may include a catch 44 having a planar portion 46. The catch 44 can also include a first foot 48 that extends inwardly from the planar portion 46 for engaging at least one of the surfaces of the deck railing 22. The catch 44 may be biased inwardly to engage the planar portion 46 with the deck railing 22. The catch 44 may also be configured to flex outwardly for disengaging the deck light assembly 20 from the deck railing 22. With the catch 44 in its outward or disengaged position, the deck light assembly 20 may be slid along the deck railing 22 or may be lifted and removed entirely.

According to a still further aspect, the assembly 20 can account for varying thicknesses in railing boards due to its flexibility. Additionally the assembly 20 can have at least one beverage holder formed in the upper surface. The assembly 20 can also include wireless Bluetooth or Wifi capabilities to allow for streaming of music such as via an associated mobile phone.

Obviously, many modifications and variations of the present invention are possible in light of the above teachings and may be practiced otherwise than as specifically described while within the scope of the appended claims.

What is claimed is:

1. A deck light assembly for attachment to a deck railing having a top surface and a bottom surface, the deck light assembly comprising:
   a body having a generally C-shape including a top plate extending between a first leg and a second leg and defining a lower surface for engaging the top surface of the deck railing,
   the top plate including an upper surface generally parallel and spaced apart from the lower surface with the upper surface defining a portion of the deck light assembly farthest away from the legs,
   a battery and an LED light disposed at least partially within the body,
   a portion of the first leg including a catch having a planar portion extending away from the top plate and biased inwardly to engage the deck railing and configured to flex outwardly to disengage the deck light assembly from the deck railing, and a first foot extending inwardly from the planar portion of the catch for engaging the bottom surface of the deck railing.

2. The deck light assembly of claim 1 further comprising:
a solar panel disposed upon the top plate for charging the battery when exposed to light and causing the LED light to illuminate in response to an absence of ambient light.

3. The deck light assembly of claim 1 wherein the body includes a core nesting within a cover, and
wherein the catch is integrally formed with the core.

4. The deck light assembly of claim 1 further comprising:
a nub extending from the catch beyond the first foot for application of an outward force to cause the planar portion to flex outwardly allowing the deck light assembly to be attached or removed from the deck railing.

5. The deck light assembly of claim 1 further comprising:
a shade for directing the output of the LED light in a predetermined pattern.

6. The deck light assembly of claim 1 further comprising:
the lower surface of the top plate defining a plurality of standoffs for spacing the top plate from the top surface of the deck railing and allowing airflow therebetween.

7. The deck light assembly of claim 1 wherein the first foot has a generally triangular cross-section.

8. The deck light assembly of claim 1 further comprising:
a second foot extending inwardly from the second leg opposite the top plate for engaging the bottom surface of the deck railing.

9. The deck light assembly of claim 1 further comprising:
the body including a core nesting within a cover,
a second tab integrally formed with the core as a portion of the first leg extending perpendicular to the top plate adjacent the cover, and
a ledge integrally formed with the cover extending inwardly from an inner surface of the first leg for engaging the second tab to secure the core with the cover at the first leg.

10. The deck light assembly of claim 2 wherein the solar panel is disposed within an inset panel in the upper surface of the top plate and located centrally between the legs.

11. The deck light assembly of claim 3 further comprising:
the core defining an interior surface on one of the first leg and the second leg with a set of third tabs defining a pocket on the interior surface for holding a circuit board.

12. The deck light assembly of claim 3 further comprising:
the core defining a pair of walls extending upwardly from the lower surface parallel to one another along the sides of the top plate and defining a cavity between the walls and below the cover.

13. The deck light assembly of claim 5 wherein the shade protrudes from an outer surface of one of the first leg and the second leg with the LED light contained therein.

14. The deck light assembly of claim 5 wherein the shade has a parabolic shape extending to a flat bottom defining a hole for allowing light to shine downwardly from the deck railing.

15. The deck light assembly of claim 8 wherein the body includes a core nesting within a cover, and
wherein the second foot is integrally formed with the core.

16. The deck light assembly of claim 11 wherein the LED light is directly attached to the circuit board.

17. The deck light assembly of claim 11 further comprising:
a set of rails protruding from the interior surface within the pocket for securing the circuit board in wedging engagement with the third tabs.

18. The deck light assembly of claim 12 further comprising:
a plurality of fourth tabs extending further upward from the walls for engaging corresponding depressions in the cover to prevent relative motion between the core and the cover.

19. The deck light assembly of claim 15 wherein the second foot defines an indentation for receiving a first tab that extends inwardly from the second leg of the cover to secure the core with the cover.

20. A deck light assembly for attachment to a deck railing having a top surface and a bottom surface, the deck light assembly comprising:
a body having a generally C-shape including a top plate extending between a first leg and a second leg and defining a lower surface for engaging the top surface of the deck railing,
a battery and an LED light disposed at least partially within the body,
a portion of the first leg including a catch having a planar portion extending away from the top plate and biased inwardly to engage the deck railing and configured to flex outwardly to disengage the deck light assembly from the deck railing,
a first foot extending inwardly from the planar portion of the catch for engaging the bottom surface of the deck railing,
a shade for directing the output of the LED light in a predetermined pattern; and
wherein the shade protrudes from an outer surface of one of the first leg and the second leg with the LED light contained therein.

* * * * *